United States Patent
Lei et al.

(10) Patent No.: US 9,794,400 B2
(45) Date of Patent: Oct. 17, 2017

(54) MOBILE TERMINAL AND RINGTONE PLAYING METHOD THEREOF

(71) Applicant: Huizhou TCL Mobile Communication Co., Ltd, Huizhou, Guangdong (CN)

(72) Inventors: Ming Lei, Huizhou (CN); Yuanzu Tang, Huizhou (CN); Fan Wang, Huizhou (CN); Haiying He, Huizhou (CN); Shanquan Wang, Huizhou (CN); Wanming Zhang, Huizhou (CN)

(73) Assignee: HUIZHOU TCL MOBILE COMMUNICATION CO., LTD, Huizhou (CN)

( * ) Notice: Subject to any disclaimer, the term of this patent is extended or adjusted under 35 U.S.C. 154(b) by 0 days.

(21) Appl. No.: 14/647,676

(22) PCT Filed: May 22, 2014

(86) PCT No.: PCT/CN2014/078109
§ 371 (c)(1),
(2) Date: May 27, 2015

(87) PCT Pub. No.: WO2015/131451
PCT Pub. Date: Sep. 11, 2015

(65) Prior Publication Data
US 2016/0255190 A1    Sep. 1, 2016

(30) Foreign Application Priority Data
Mar. 3, 2014 (CN) .......................... 2014 1 0075085

(51) Int. Cl.
*H04M 3/42* (2006.01)
*H04M 19/04* (2006.01)
(Continued)

(52) U.S. Cl.
CPC ...... *H04M 3/42051* (2013.01); *H04L 65/602* (2013.01); *H04M 3/02* (2013.01);
(Continued)

(58) Field of Classification Search
CPC ................ H04N 9/80; H04N 19/00472; H04L 29/08108; H04W 4/02
(Continued)

(56) References Cited

U.S. PATENT DOCUMENTS

| 7,747,290 | B1 * | 6/2010 | Lundy | H04M 19/04 |
| | | | | 455/414.1 |
| 2008/0167993 | A1 * | 7/2008 | Cue | G06Q 20/10 |
| | | | | 705/51 |
| 2011/0231887 | A1 * | 9/2011 | West | G11B 27/34 |
| | | | | 725/116 |

FOREIGN PATENT DOCUMENTS

| CN | 101022468 A | 8/2002 |
| CN | 101193146 A | 6/2008 |

(Continued)

OTHER PUBLICATIONS

English Abstract of CN101193146 A.
English Abstract of CN102710860 A.
English Abstract of CN101022468 A.

*Primary Examiner* — Muthuswamy Manoharan

(57) ABSTRACT

A mobile terminal and a ringtone playing method thereof are provided. The playing method includes: selecting a music file which to be set as a ringtone, and popping up a playing preview interface corresponding to the music film and, meanwhile, playing the music file; sliding a cursor of the playing preview interface to select a start position and a playing end position on a playing progress bar corresponding to the music file so as to acquire and save playing information of the ringtone, wherein the playing information comprises a playing start time point and a playing end time
(Continued)

point of the ringtone; and in response to occurrence of a ringing event, reading the saved playing information of the ringtone and playing a music clip between the playing start time point and the playing end time point.

9 Claims, 5 Drawing Sheets

(51) Int. Cl.
  *H04M 3/02* (2006.01)
  *H04L 29/06* (2006.01)
  *H04W 88/02* (2009.01)
(52) U.S. Cl.
  CPC ........ H04M 19/04 (2013.01); *H04M 3/42153* (2013.01); *H04W 88/02* (2013.01)
(58) Field of Classification Search
  USPC .................................................... 455/414.1
  See application file for complete search history.

(56) References Cited

FOREIGN PATENT DOCUMENTS

| | | | |
|---|---|---|---|
| CN | 101207871 A | 6/2008 | |
| CN | 102710860 A | 10/2012 | |

\* cited by examiner

MOBILE TERMINAL AND RINGTONE PLAYING METHOD THEREOF

RELATED APPLICATION

This application is a national phase entry under 35 USC 371 of International Patent Application No. PCT/CN2014/078109 filed on 22 May 2014, which claims priority from Chinese Patent Application No. 201410075085X filed on 3 Mar. 2014, the disclosures of which are incorporated in their entirety by reference herein.

FIELD OF THE INVENTION

The present disclosure generally relates to the technical field of mobile terminal communication, and more particularly, to a mobile terminal and a ringtone playing method thereof.

BACKGROUND OF THE INVENTION

Nowadays, a user can freely select his/her preferred music file as a ringtone of a mobile terminal (e.g., a mobile phone), and in response to occurrence of a ringing event (e.g., an incoming call), the ringtone is played typically from the start of the music file. However, the playing volume of the start of the music file is relatively low and cannot prompt the user timely and effectively, so selecting a certain part of the music file (e.g., the climax of the music) as the ringtone has been widely accepted by users.

In the prior art, the user generally uses a computer or a mobile phone to download an accomplished music clip, or uses music software to truncate a part of his/her preferred music file. However, downloading of the music clip consumes the network traffic of the mobile phone and is restricted by the music file download resources, which greatly reduces the freedom of choice of the user. Moreover, to obtain a ringtone through truncation, the music file needs to be first truncated on a personal computer (PC) and then input into the mobile phone, and this makes the operation very inconvenient for the user. Further speaking, even if the truncation is done on the mobile phone by means of music software, it will still additionally increase consumption of the memory resource of the mobile phone and the operation load of the system of the mobile phone.

SUMMARY OF THE INVENTION

Accordingly, the present disclosure provides a mobile terminal and a ringtone playing method thereof, which allow the user to freely select a desired music clip as the ringtone in a convenient and efficient way.

To solve the aforesaid technical problems, one technical solution adopted by the present disclosure is to provide a ringtone playing method. The ringtone playing method comprises the following steps of: selecting a music file which is to be set as a ringtone, and popping up a playing preview interface corresponding to the music file and, meanwhile, playing the music file; sliding a cursor of the playing preview interface to select a playing start position and a playing end position on a playing progress bar corresponding to the music file so as to acquire and save playing information of the ringtone, wherein the playing information comprises a playing start time point and a playing end time point of the ringtone; and in response to occurrence of a ringing event, reading the saved playing information of the ringtone and playing a music clip between the playing start time point and the playing end time point.

In one embodiment, the music file is a default ringtone preset in the system, and the method comprises the following step before playing the music file or before reading the saved playing information of the ringtone: carrying out a positioning operation on the music file to determine whether a playing start time point is preset in the music file, and if the answer is "yes", then acquiring the playing start time point preset in the music file.

In one embodiment, the step of playing the music file or the step of playing a music clip between the playing start time point and the playing end time point comprises: playing the music file from a zero playing time point if it is determined that no playing start time point is preset in the music file.

In one embodiment, the music file is a user-defined music file, and the method comprises the following steps before reading the saved playing information of the ringtone; setting a playing object: and establishing and saving mapping relationships between the playing object and the playing information of the ringtone; and the step of reading the saved playing information of the ringtone further comprises: reading the playing information of the ringtone corresponding to the playing object according to the playing object of the ringing event in combination with the mapping relationships.

In one embodiment, the ringing event is an incoming call, and the playing object is a contact saved in a contact list.

To solve the aforesaid technical problems, another technical solution adopted by the present disclosure is to provide a mobile terminal. The mobile terminal comprises: a ringtone setting module, being configured to select a music file which is to be set as a ringtone, and control a display screen of the mobile terminal to pop up a playing preview interface corresponding to the music file; a ringtone playing module, being configured to play the music file at the same time when the playing preview interface is popped up; and a ringtone management module, being configured to, when a cursor of the playing preview interface is slid to select a playing start position and a playing end position on a playing progress bar corresponding to the music file, acquire and save playing information of the ringtone, wherein the playing information comprises a playing start time point and a playing end time point of the ringtone; and in response to occurrence of a ringing event, the ringtone management module is further configured to read the saved playing information of the ringtone and control the ringtone playing module to play a music clip between the playing start time point and the playing end time point.

In one embodiment, the music file is a default ringtone preset in the system, and the ringtone management module is further configured to carry out a positioning operation on the music file to determine whether a playing start time point is preset in the music file, and if the answer is "yes", then acquire the playing start time point preset in the music file and control the ringtone playing module to play the music file from the preset playing start time point.

In one embodiment, the ringtone management module is configured to control the ringtone playing module to play the music file from a zero playing time point if it is determined that no playing start time point is preset in the music file.

In one embodiment, the music file is a user defined music file, and the ringtone management module is further configured to set a playing object, and establish and save mapping relationships between the playing, object and the playing information of the ringtone; and in response to occurrence of a ringing event, the ringtone management module reads the playing information of the ringtone corresponding to the playing object according to the playing object of the ringing event in combination with the mapping relationships.

In one embodiment, the ringing event is an incoming call, and the playing object is a contact saved in a contact list.

As compared to the prior art, the present disclosure has the following benefits: the present disclosure allows a user to freely select a desired music clip as the ringtone in a convenient and efficient way by selecting a music file which is to be set as a ringtone, sliding a cursor of the playing preview interface corresponding to the music file to acquire and save playing information of the ringtone that comprises a playing start time point and a playing end time point of the ringtone, and in response to occurrence of a ringing event, playing a music clip between the playing start time point and the playing end time point.

DETAILED DESCRIPTION OF THE INVENTION

To make the objectives, technical solutions and technical effects of the present disclosure clearer, a detailed description will be further made on embodiments of the present disclosure with reference to FIGS. 1~5.

A ringtone playing method according to the present disclosure is applicable to smart phones with a touch screen, but it is not limited to mobile phones and is also applicable to mobile terminals such as electronic organizers, personal digital assistants (PDA), portable communication devices, etc. Additionally, the ringtone may be an incoming call ringtone, a text message ringtone, an alarm ringtone or a to-do items prompt ringtone, but it is not limited thereto. For convenience of description, a smart phone and an incoming call ringtone thereof are taken as examples for description throughout the present disclosure.

Figure 1:
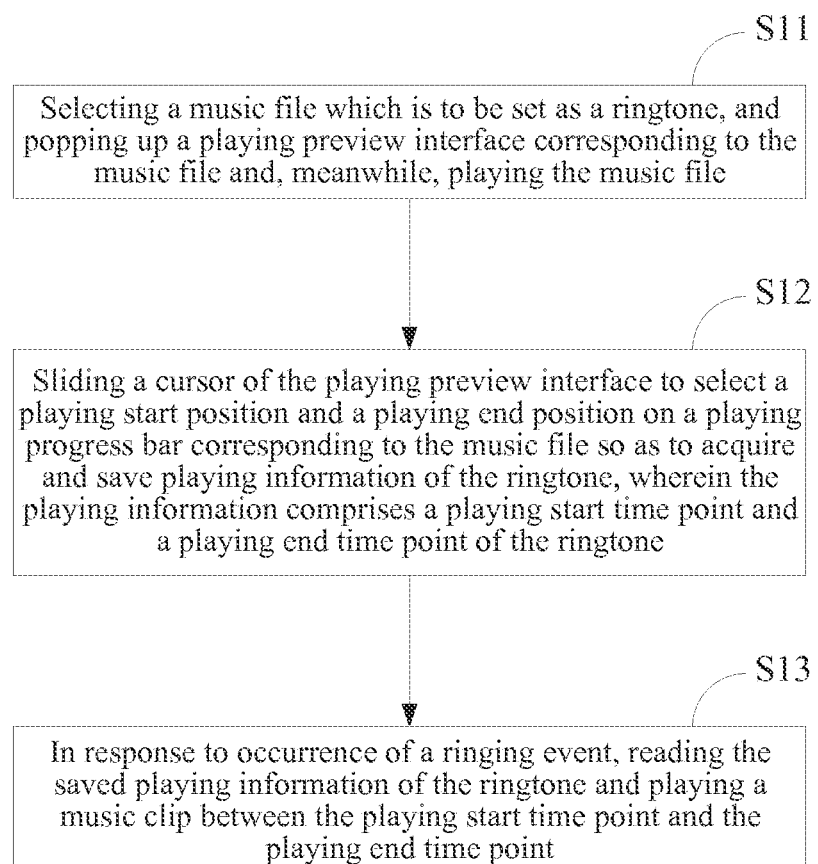
FIG. 1 is a flowchart diagram of a ringtone playing method according to a first embodiment of the present disclosure.

FIG. 1 is a flowchart diagram of a ringtone playing method according to a first embodiment of the present disclosure. As shown in FIG. 1, the playing method of this embodiment comprises the following steps of:

Step S11: selecting a music file which is to be set as a ringtone, and popping up a playing preview interface corresponding to the music file and, meanwhile, playing the music file.

Figure 2:
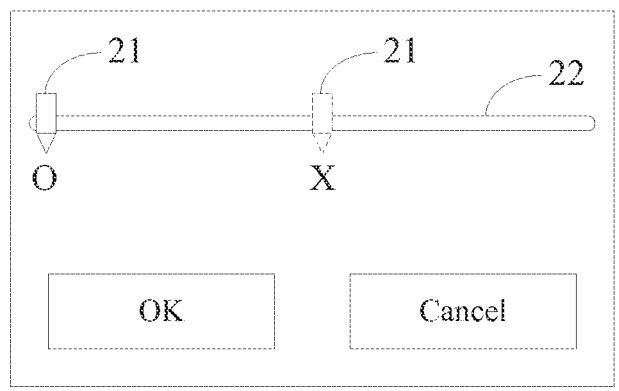
FIG. 2 is a functional block diagram of a playing preview interface of a music file according to a preferred embodiment of the present invention.

On a ringtone setting interface of the mobile phone, a user can select his/her preferred music file which is to be set as the ringtone simply by clicking on a touch screen. After a music file is selected, the touch screen pops up a playing preview interface as shown in FIG. 2, and meanwhile the mobile phone plays the music file for audition by the user. It shall be appreciated that, at the time of the first audition or the first setting of the music file, a cursor 21 is at a zero playing time point O, i.e., the music file is played from the zero playing time point O.

The music file may be a music file of any formats currently available, including mp3, wav, amr, wma, etc.

Step S12: sliding a cursor of the playing preview interface to select a playing start-position and a playing end position on a playing progress bar corresponding to the music file so as to acquire and save playing information of the ringtone, wherein the playing information comprises a playing start time point and a playing end time point of the ringtone.

Still referring to FIG. 2, if the user does not move the cursor 21 during the playing of the music file, then the position of the cursor 21 will be synchronously displayed on a playing progress bar 22 as the music file is being played, and the position is actually presented as a current playing time point. If the user utilizes his finger to select and slide the cursor 21 on the touch screen to the playing start position X (as shown in FIG. 2), then after the user removes his/her finger from the touch screen, the mobile phone will play the music file from the playing start position X. A playing end position where the mobile phone is to end up playing of the music file can be selected in a similar way. Of course, the user can also select the playing start position X and the playing end position by operating physical direction keys to control the sliding of the cursor 21.

The user can press a Cancel key on the playing preview interface to cancel the playing start position and the playing end position of the music clip to be played, and press an OK key on the playing preview interface to confirm the music clip to be played. After the confirmation, the mobile phone automatically saves the playing start time point corresponding to the playing start position and the playing end time point corresponding to the playing end position so as to form the playing information of the desired ringtone. It shall be appreciated that, the playing information of the ringtone of this embodiment comprises not only the playing start time point and the playing end time point of the ringtone, but also the basic attribute information of the music file, e.g., the title, the format, or the bit rate of the music file.

Step S13: in response to occurrence of a ringing event, reading the saved playing information of the ringtone and playing a music clip between the playing start time point and the playing end time point.

The ringing event of this embodiment refers to any event that requires a ringtone to prompt the user, and it may be but is not limited to an incoming call, an incoming short-message, or come-up of a scheduled time. The come-up of a scheduled time means that the scheduled time of an alarm clock or agenda in the mobile phone comes up. Further, the mobile phone stops playing the music clip when the user answers the incoming call or checks the short message.

Preferably in this embodiment, the mobile phone plays the music file normally from the playing start time point directly and stops playing at the playing end time point. In other embodiments, based on the fast-forward and rewinding functions of the existing mobile phones in music playing, the mobile phone may jump to a preset playing time point to play the ringtone. Thus, in occurrence of an incoming call, the mobile phone may play the ringtone in the following way: fast forward from the zero playing time point to the saved playing start, time point to play the ringtone, then play the music file normally and stop directly playing the music file at the playing end time point.

Additionally, the ringtones for the incoming call and the scheduled time may be set to be played cyclically, while the ringtone for the incoming short message may be set to be played only once. If the user answers the phone or checks the short message or the scheduled event, the system of the mobile phone will automatically stop playing the music clip regardless of whether the ringtone has been played to the playing end time point, to make it convenient for the user to answer the phone or check the short message or the scheduled event.

As can be seen from the above descriptions, the playing method of this embodiment can use the music clip between the playing start time point and the playing end time point as the ringtone of the ringing event simply by sliding the cursor of the playing preview interface to obtain the playing start time point and the playing end time point of the music file. This allows the user to freely select his/her preferred music clip with very simple and convenient operations. Meanwhile, as compared to the prior art, downloading and use of music software for truncation become unnecessary, so the network resource and memory resource consumption of the mobile phone and the operation load of the system processor will not be increased additionally.

Figure 3:
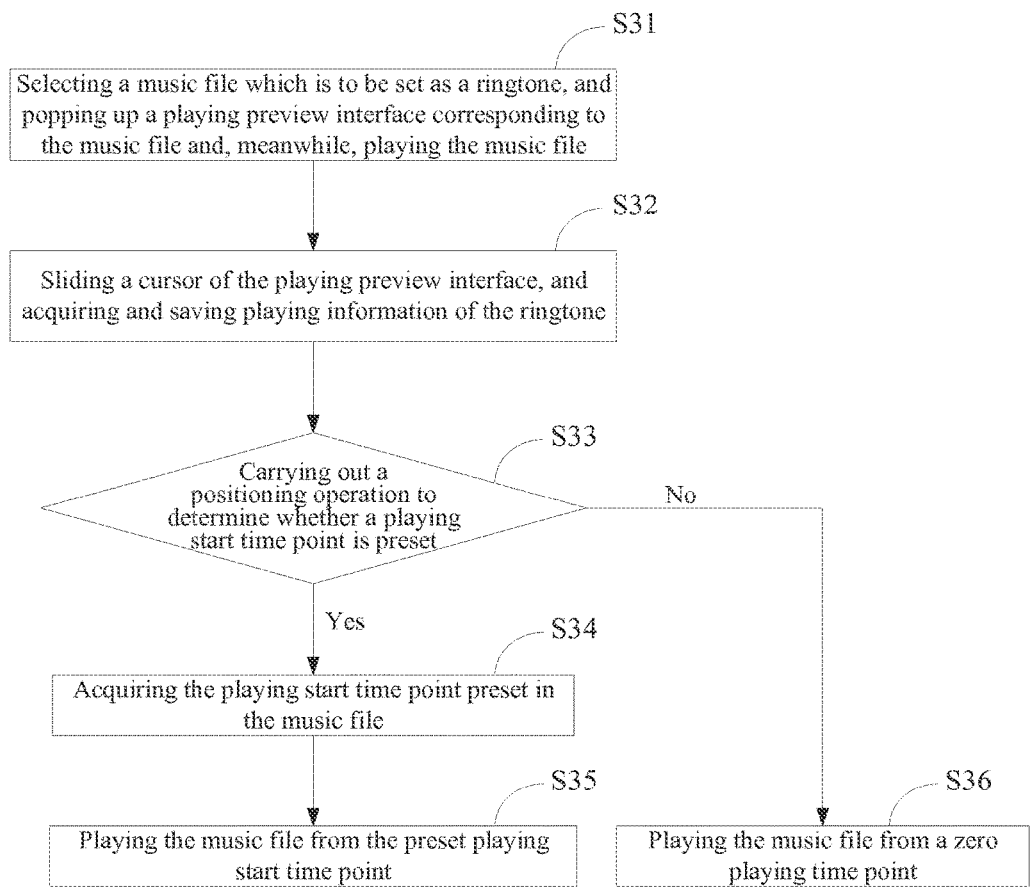
FIG. 3 is a flowchart diagram of a ringtone playing method according to a second embodiment of the present disclosure.

The present disclosure further provides a ringtone playing method according to a second embodiment. As shown in FIG. 3, this embodiment is described based on the playing method of the first embodiment, and this embodiment differs from the first embodiment in that: the music file which is to be set as a ringtone is a default ringtone preset in the system and a positioning operation is required before playing the music file. The ringtone playing method specifically comprises the following steps of:

Step S31: selecting a music file which is to be set as a ringtone, and popping up a playing preview interface corresponding to the music file and, meanwhile, playing the music file.

A smart phone installed with an Android system is taken as an example for description in this embodiment. During the setting of the ringtone, a ringtone setting interface is popped up to allow the user to select his/her preferred default ringtone, and then the Android system calls the function "setActualDefaultRingtoneUrl" of a ringtone manager to record the Uniform Resource Identifier (URI) of the selected default ringtone (music file) into a system database.

Step S32: sliding a cursor of the playing preview interface to select a playing start position and a playing end position on a playing progress bar corresponding to the music file so as to acquire and save playing information of the ringtone.

After the user has confirmed the music file which is to be played, the system of the mobile phone utilizes the ringtone manager to save the URI of the selected music file together with the function information corresponding to the acquired playing start time point and the playing end time point into the system database. Then, the system of the mobile phone reloads the function "setActualDefaultRingtoneUrl" of the ringtone manager. The function name of the reloaded function is the same as that of the original function, and for convenience of subsequently selecting a matched function, the reloaded function is distinguished from the original function by an integer-type parameter "StartPoint" that is added in the reloading process.

The URI of the ringtone recorded after the reloading is completely the same as what recorded before the reloading. When a playing start time point has been set, the ringtone manager combines the URI with the playing start, time point with a "::" therebetween, and then records the obtained character string into the system database.

Based on this, in the reloaded function, the playing start time point is recorded in the database as "ringtonestart|url::startpoint::overpoint", and this record comprises not only the information of the playing start time point and the playing end time point, but also the URI information of the music file.

Step S33: in response to occurrence of a ringing event, carrying out a positioning operation on the music file to determine whether a playing start time point is preset in the music file.

Although the playing start time point and the playing end time point have already been saved in the step S32, it is still necessary to further confirm in this step whether a playing start time point has been preset so as to ensure preciseness of the playing.

Step S34: acquiring the playing start time point preset in the music file if it is determined that a playing start time point is preset in the music file.

Step S35: playing the music file from the preset playing start time point.

In response to occurrence of ail incoming call, a telephone application of the mobile phone firstly acquires the URI information set in the step S35 via an Audio Profile Service, and then creates an instance of a ringtone player through the interface function of the ringtone manager, and the detailed process is as follows:

acquiring the URI information of the music file to be played from the function "setActualDefaultRingtoneUrl" of the ringtone manager;

comparing the reloaded URI information acquired via the Audio Profile Service from the system database with the URI information acquired from the function "setActualDefaultRingtoneUrl"; and if the two pieces of URI information are the same, modifying the interface function of the original ringtone manager to add one new interface function "setStartPoint(int point)".

The telephone application carries out another positioning operation on the newly created instance of the ringtone player, and this positioning operation differs from that of the step S33 in that: it is carried out only to acquire the playing start time point, and then the ringtone is played from the playing start time point until the ringtone ends at the playing end time point.

Step S36: playing the music file from a zero playing time point if it is determined that 110 playing start time point is preset in the music file.

Furthermore, the default ringtones are provided by the system of the mobile phone and the number thereof is limited. Therefore, when the user wants to set one of the default ringtones as the ringtone, it is possible that this default ringtone has already been set for a playing start time point and/or a playing end time point of ringtone corresponding to another ringing event. For this reason, in other embodiments of the present disclosure, a positioning operation may also be carried out between popping up a playing preview interface that corresponds to the music file and playing the music file in the step S31.

Figure 4:
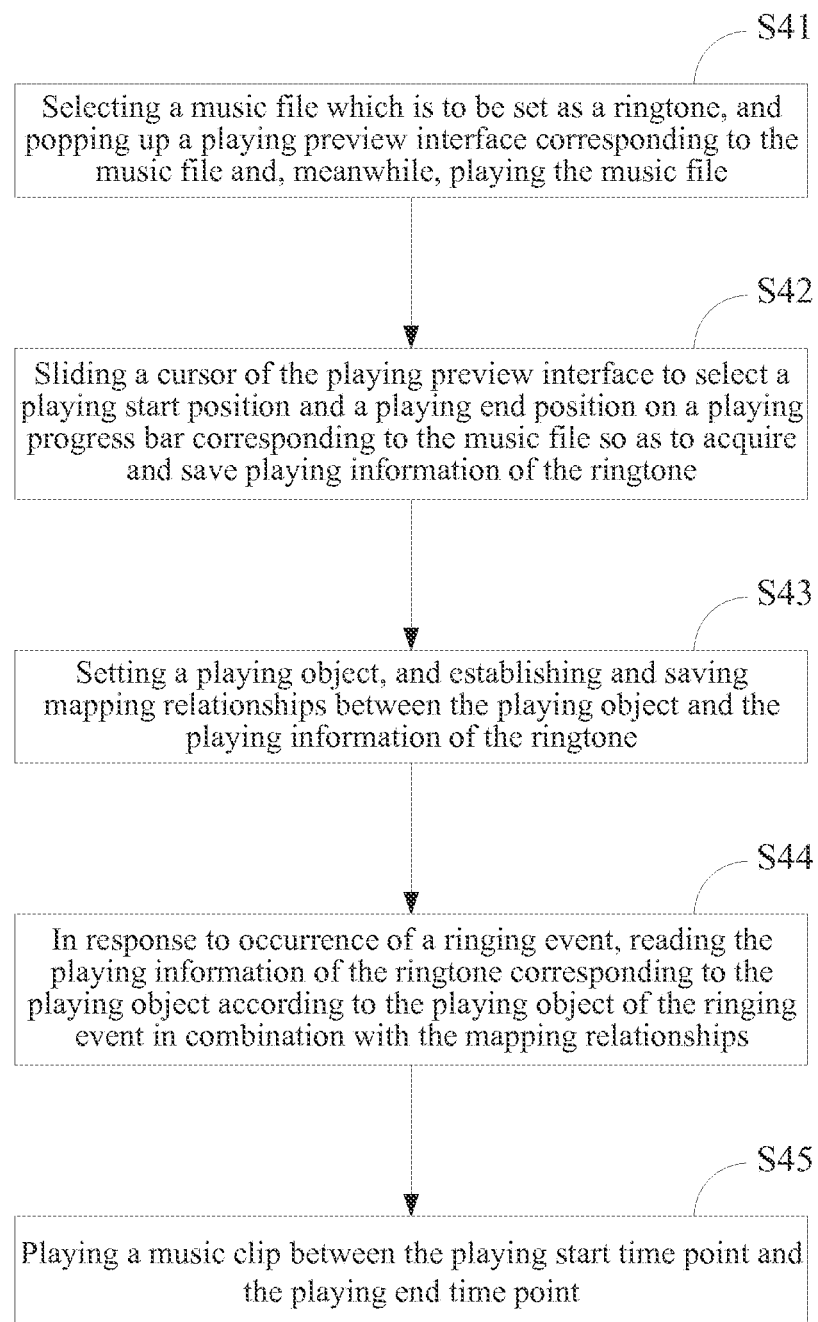
FIG. 4 is a flowchart diagram of a ringtone playing method according to a third embodiment of the present disclosure.

The present disclosure further provides a ringtone playing method according to a third embodiment. As shown in FIG. 4, the playing method of this embodiment is described based on the first embodiment, and this embodiment differs from the first embodiment in that the music file which is to be set as a ringtone is a user-defined music file. The ringtone playing method specifically comprises the following steps of:

Step S41: selecting a music file which is to be set as a ringtone, and popping up a playing preview interface corresponding to the music file.

Step S42: sliding a cursor of the playing preview interface to select a playing start position and a playing end position on a playing progress bar corresponding to the music file so as to acquire and save playing information of the ringtone.

Step S43: setting a playing object, and establishing and saving mapping relationships between the playing object and the playing information of the ringtone.

The playing object in this embodiment corresponds to a contact saved in a contact list, but of course, it may also be a playing object corresponding to some other ringing event.

After the playing information of the ringtone is acquired, the playing information of the ringtone is associated with a certain contact, or is associated with several contacts in an opened contacts application of the mobile phone so as to establish and save mapping relationships between one or more playing objects and the playing information of the ringtone.

Of course, in other embodiments, it may also be that the contacts application of the mobile phone is opened firstly, and then a certain contact is selected and the steps S41 and S42 are executed in the opened ringtone setting interface so as to associate the contact with the playing information of a certain music file.

After the mapping relationships are established, the system of the mobile phone adds a column function "ringtoneStart" into a contacts database to record the playing information of the ringtone corresponding to the contact. It shall be appreciated that, the mapping relationships are saved into the contacts database rather than the system database of the second embodiment.

Step S44: in response to occurrence of a ringing event, reading the playing information of the ringtone corresponding to the playing object according to the playing object of the ringing event in combination with the mapping relationships.

On the basis of the description of the step S36 in the Android system playing method according to the second embodiment, this embodiment also needs to create an instance of a ringtone player in response to occurrence of an incoming call, but this embodiment differs from the second embodiment in that: the URI information of the music file to be displayed is acquired from the contacts database, and the playing information of the ringtone is directly acquired from the contacts database in the reading process.

Step S45: playing a music clip between the playing start time point and the playing end time point.

As can be seen from the above descriptions, this embodiment not only can set playing positions for a plurality of selected audio files respectively, but also can set corresponding playing positions for ringtones corresponding to different contacts, and can further set a plurality of playing positions for a same audio file to correspond to different contacts through Step 43. In this way, the user can freely associate the ringtone with the playing object of the ringing event to satisfy demands for individualized ringtones.

It shall be appreciated that, the three embodiments described above are only some of but not all of the embodiments of the present disclosure. All other embodiments that can be devised without making inventive efforts by those of ordinary skill in the art upon reviewing the three embodiments of the present disclosure (e.g., embodiments devised by combining some technical features of the three embodiments) shall fall within the scope of the present disclosure.

Figure 5:
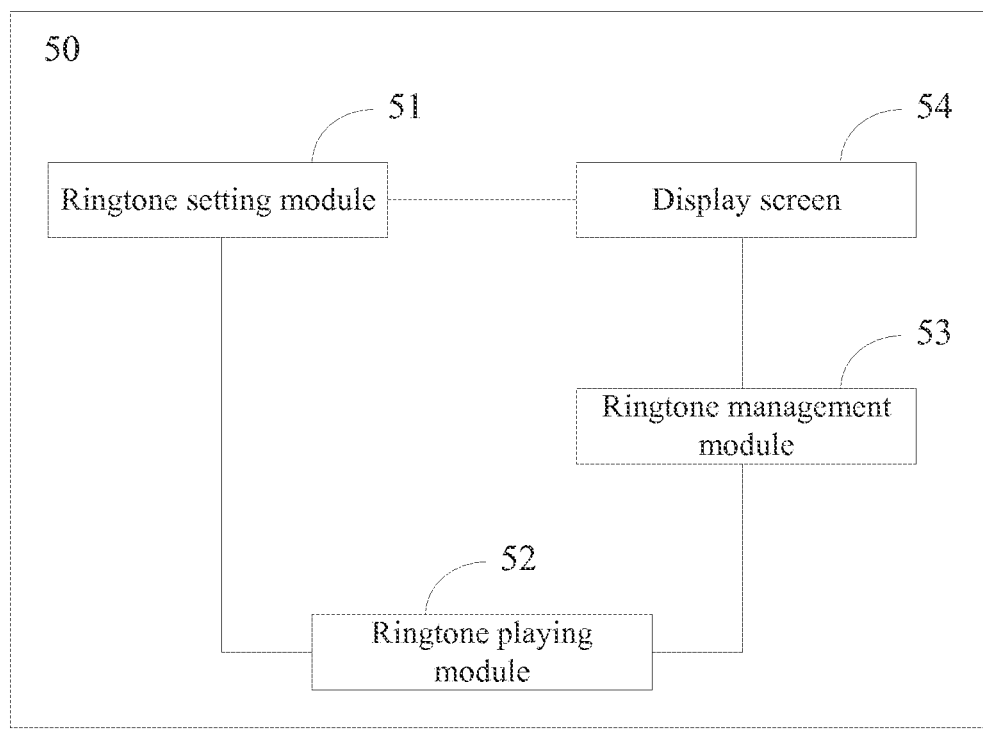
FIG. 5 is a functional block diagram of a mobile terminal according to the first embodiment of the present disclosure.

The present disclosure further provides a mobile terminal. Referring to FIG. 5, a functional block diagram of the mobile terminal according to the first embodiment of the present disclosure is shown therein. The mobile terminal 50 comprises a ringtone setting module 51, a ringtone playing module 52, a ringtone management module 53 and a display screen 54.

The ringtone setting module 51 is configured to select a music file which is to be set as a ringtone, and control the display screen 54 of a mobile terminal (50 to pop up a playing preview interface corresponding to the music file.

The ringtone playing module 52 is configured to play the music file at the same time when the playing preview interface is popped up on the display screen 54.

The ringtone management module 53 is configured to, when a cursor of the playing preview interface popped up on the display screen 54 is slid to select a playing start position and a playing end position on a playing progress bar corresponding to the music file, acquire and save playing information of the ringtone, wherein the playing information comprises a playing start time point and a playing end time point of the ringtone.

In response to occurrence of a ringing event, the ringtone management module 53 is further configured to read the saved playing information of the ringtone and control the ringtone playing module 52 to play a music clip between the playing start, time point and the playing end time point.

Corresponding to the aforesaid ringtone playing method of the second embodiment, when the music file is a default ringtone preset in the system, the ringtone management module 53 is further configured to carry out a positioning operation on the music file to determine whether a playing start time point is preset in the music file, and if the answer is "yes", then acquire the playing start time point preset in the music file and control the ringtone playing module 52 to play the music file from the preset playing start time point. Otherwise if it is determined that no playing start time point is preset in the music tile, the ringtone management module is then configured to control the ringtone playing module 52 to play the music file from a zero playing time point. Corresponding to the aforesaid ringtone playing method of the third embodiment, when the music file is a user-defined music file, the ringtone management module 53 is further configured to set a playing object, and establish and save mapping relationships between the playing object and the playing information of the ringtone. In response to occurrence of a ringing event, the ringtone management module 53 reads the playing information of the ringtone corresponding to the playing object according to the playing object of the ringing event in combination with the mapping relationships so as to control the ringtone playing module 52 to play the music file.

It shall be appreciated that, the mobile terminal 50 of FIG. 5 according to the present disclosure is based on the playing methods of the embodiments shown in FIGS. 1~4. The functional modules of the mobile terminal 50 can execute the steps of each of the methodical embodiments correspondingly, and this will not be further described herein.

Additionally, it shall be understood that, the division of the individual modules of the mobile terminal disclosed in the present disclosure only represents a division of logical functions, and there may be other division manners in practical implementations. For example, a number of modules may be combined or may be integrated into another system, or some features may be omitted or may not be performed. Furthermore, mutual coupling or communication connections between the modules may be achieved via a plurality of interfaces, or in an electrical way or some other way.

As integral components of the mobile terminal, the aforesaid functional modules may be or may not be physical blocks, may be co-located at a same site or be distributed in a plurality of network units, and may be implemented either in the form of hardware or in the form of software function blocks. The objective of the present disclosure can be achieved by optionally using parts of or all of the modules depending on actual need.

According to the above descriptions, the present disclosure selects a music file which is to be set as a ringtone, slides a cursor on the playing preview interface corresponding to the music file to acquire and save playing information of the ringtone that comprises a playing start time point and a playing end time point of the ringtone, and in response to occurrence of a ringing event, plays a music clip between the playing start time point and the playing end time point. In this way, the present disclosure not only allows a user to freely select a desired music clip as the ringtone in a convenient and efficient way, but also satisfies the user's demands for individualized ringtone setting.

Furthermore, it is apparent to those skilled in the art, the present disclosure also provides a mobile terminal, which comprises a non-transitory program storage medium and a processor. The non-transitory program storage medium stores a program executed by the processor to perform the method as described in above. Furthermore, it is apparent to those skilled in the art that, various modules, the ringtone setting module 51, the ringtone playing module 52 and the ringtone management module 53 as shown in FIG. 5 are software modules or software units. In another aspect, it is well-known that various software modules or software units inherently are stored in the non-transitory program storage medium and executed by the processor.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method of playing ringtone on a mobile terminal, the mobile terminal comprising a ringtone setting module, a ringtone playing module, a ringtone management module and a display screen, the method comprising the following steps of:

the ringtone setting module selecting a music file which is to be set as a ringtone, and the displaying screen popping up a playing preview interface corresponding to the music file and, meanwhile, the ringtone playing module playing the music file;

the ringtone management module sliding a cursor of the playing preview interface to select a playing start position and a playing end position on a playing progress bar corresponding to the music file so as to acquire and save playing information of the ringtone, wherein the playing information comprises a playing start time point and a playing end time point of the ringtone; and in response to occurrence of a ringing event, the ringtone management module reading the saved playing information of the ringtone and the ringtone playing module playing a music clip between the playing start time point and the playing end time point;

wherein the music file is one of a default ringtone preset in the system and a user-defined music file;

when the music file is the default ringtone preset in the system, the method comprises the following step before the displaying screen popping up the playing preview interface and, meanwhile, the ringtone playing module playing the music file, or before the ringtone management module reading the saved playing information of the ringtone;

the ringtone management module carrying out a positioning operation on the music file to determine whether a playing start time point is preset in the music file, and when the answer is "yes", then acquiring the playing start time point preset in the music file;

when the music file is the user-defined music file, the method comprises the following steps before the ringtone management module reading the saved playing information of the ringtone;

the ringtone management module setting a playing object; and the ringtone management module establishing and saving mapping relationships between the playing object and the playing information of the ringtone so that, when the saved playing information of the ringtone needs to be read, the playing information of the ringtone corresponding to the playing object is read according to the playing object of the ringing event in combination with the mapping relationships;

wherein the ringtone is played in a following way: playing the music file fast forward from the zero playing time point to the playing start time point, then playing the music file normally and stopping directly playing the music file at the playing end time point;

wherein the step of in response to the occurrence of the ringing event, the ringtone management module reading the saved playing information of the ringtone and the ringtone playing module playing a music clip between the playing start time point and the playing end time point, comprises:

acquiring URI information of the music file to be played from a function "setActualDefaultRingtoneUrl" of a ringtone manager;

comparing a reloaded URI information acquired via an Audio Profile Service from the system database with the URI information acquired from the function "setActualDefaultRingtoneUrl"; and if two pieces of the URI information are the same, modifying an interface function of the ringtone manager to add one new interface function "setStartPoint (int point)".

2. The playing method of claim 1, wherein the step of the ringtone playing module playing the music file or the step of the ringtone playing module playing the music clip between the playing start time point and the playing end time point comprises:

the ringtone playing module playing the music file from a zero playing time point when it is determined that no playing start time point is preset in the music file.

3. The playing method of claim 1, wherein the ringing event is an incoming call, and the playing object is a contact saved in a contact list.

4. A ringtone playing method, comprising the following steps of:

selecting a music file which is to be set as a ringtone, and popping up a playing preview interface corresponding to the music file and, meanwhile, playing the music file;

sliding a cursor of the playing preview interface to select a playing start position and a playing end position on a playing progress bar corresponding to the music file so as to acquire and save playing information of the ringtone, wherein the playing information comprises a playing start time point and a playing end time point of the ringtone; and in response to occurrence of a ringing event, reading the saved playing information of the ringtone and playing a music clip between the playing start time point and the playing end time point;

wherein the ringtone is played in a following way: playing the music file fast forward from the zero playing time point to the playing start time point, then playing the music file normally and stopping directly playing the music file at the playing end time point;

wherein the step of in response to occurrence of a ringing event, reading the saved playing information of the ringtone and playing a music clip between the playing start time point and the playing end time point, comprises:

acquiring URI information of the music file to be played from a function "setActualDefaultRingtoneUrl" of a ringtone manager;

comparing a reloaded URI information with the URI information acquired from the function "setActualDefaultRingtoneUrl"; and if two pieces of the URI information are the same, modifying an interface function of the ringtone manager to add one new interface function "setStartPoint (int point)";

wherein when the music file is a default ringtone preset in the system, the method further comprises, before the step of playing the music file or the step of reading the saved playing information of the ringtone, carrying out a positioning operation on the music file to determine whether the playing start time point is preset in the music file, and when the answer is "yes", then acquiring the playing start time point preset in the music file;

wherein when the music file is a user-defined music file, the method further comprises, before the step of reading the saved playing information of the ringtone, setting a playing object, establishing and saving mapping relationships between the playing object and the playing information of the ringtone, and the step of reading the saved playing information of the ringtone further comprises reading the playing information of the ringtone corresponding to the playing object according to the playing object of the ringing event in combination with the mapping relationships.

5. The playing method of claim 4, wherein the step of playing the music file or the step of playing the music clip between the playing start time point and the playing end time point comprises:

playing the music file from a zero playing time point when it is determined that no playing start time point is preset in the music file.

6. The playing method of claim 4, wherein the ringing event is an incoming call, and the playing object is a contact saved in a contact list.

7. A mobile terminal, comprising:
a ringtone player;
a display screen;
a non-transitory program storage medium configured to:
select a music file which is to be set as a ringtone, and control a display screen of the mobile terminal to pop up a playing preview interface corresponding to the music file;

play the music file at the same time when the playing preview interface is popped up; and when a cursor of the playing preview interface is slid to select a playing start position and a playing end position on a playing progress bar corresponding to the music file, acquire and save playing information of the ringtone, wherein the playing information comprises a playing start time point and a playing end time point of the ringtone; and wherein, in response to occurrence of a ringing event, acquire URI information of the music file to be played from a function "setActualDefaultRingtoneUrl" of a ringtone manager, compare a reloaded URI information acquired via an Audio Profile Service from a system database with the URI information acquired from the function "setActualDefaultRingtoneUrl," and if two pieces of the URI information are the same, modify an interface function of the ringtone manager to add one new interface function "setStartPoint(int point)";

wherein when the music file is a default ringtone preset in the system, the program storage medium is further configured to carry out a positioning operation on the music file to determine whether a playing start time point is preset in the music file, and when the answer is "yes", then acquire the playing start time point preset in the music file and play the music file from the preset playing start time point;

wherein when the music file is a user-defined music file, the program storage medium is further configured to set a playing object, establish and save mapping relationships between the playing object and the playing information of the ringtone, and in response to occurrence of a ringing event, the program storage medium reads the playing information of the ringtone corresponding to the playing object according to the playing object of the ringing event in combination with the mapping relationships;

wherein the ringtone is played in a following way: playing the music file fast forward from the zero playing time point to the playing start time point, then playing the music file normally and stopping directly playing the music file at the playing end time point.

8. The mobile terminal of claim 7, wherein the program storage medium is configured to play the music file from a zero playing time point when it is determined that no playing start time point is preset in the music file.

9. The mobile terminal of claim 7, wherein the ringing event is an incoming call, and the playing object is a contact saved in a contact list.

* * * * *